June 18, 1929.                    A. F. SULZER                    1,717,815
                     MOTION PICTURE AND SOUND RECORD FILM
                             Filed June 25, 1927

INVENTOR,
Albert F. Sulzer,
BY
ATTORNEYS.

Patented June 18, 1929.

1,717,815

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

MOTION-PICTURE AND SOUND-RECORD FILM.

Application filed June 25, 1927. Serial No. 201,492.

This invention relates to a film to be used in synchronized reproduction of sound and motion pictures. A type of film used in the manufacture of motion picture positives is permanently tinted, being supplied by the manufacturer in a variety of colors. These films cannot be used in the known processes for the simultaneous reproduction of motion pictures and sound involving the use of a photographic sound record upon the film, and paralleling the picture record, because the sound is reproduced through the action of a light beam which passes through the film and is differentially affected by the photographic sound record. When the roll of film is made up of a series of strips, some of which are colorless and others tinted with various colors, the reproduction of sound will vary widely in intensity as the different portions of film are successively passed.

I have overcome this difficulty by furnishing as an article of manufacture, a film having applied thereto over that portion which is intended for the picture areas a permanent color or tint, that is, one which is not materially or noticeably affected by the photographic processes and baths, and having parallel thereto, a narrow uncolored strip opposite which the photographic sound record is made.

Reference will now be made to the accompanying drawing in which the same reference characters denote the same parts throughout:

Figure 1:
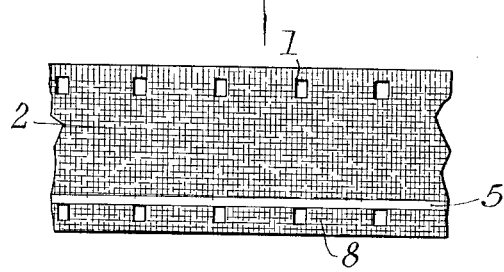
Figs. 1, 2 and 3 are respectively views of films embodying different forms of my invention.

My invention is shown as embodied in a film in the form of a long band, such as is used in motion picture work, and having perforations 1 along each border, and having upon one surface a sensitized emulsion 2. The support 3 is usually and preferably of a plastic composition including cellulose acetate or cellulose nitrate, but this may be any other cellulose derivative, such as a cellulose ether or ester, viscose, or the like. Preferably during the process of manufacture, there is embodied in this film a coloring material which is at least coextensive with the picture area. As shown, this is applied as at 4 to the rear surface of the film and comprises a dye in a solvent which penetrates the material of the film support to an extent greater than does the ordinary photographic process or bath, and incorporates in and on the rear surface of the film a dye layer which is permanent for all photographic and motion picture purposes. This is applied in Figs. 1 and 2 to the entire area of the film, except strip 5, which is left uncolored just within one of the series of marginal perforations. The film thus carries a wide colored area or longitudinal strip 7 and a narrow strip 8. In these cases the remaining area between the perforations constitutes a series of exposure fields upon which the motion picture images will be formed.

In Fig. 1, the perforations are spaced rather widely apart, it being intended that there be one perforation to a picture area, this being the common arrangement in small sized films such as are used in portable projectors for amateur and home use.

Figure 2:
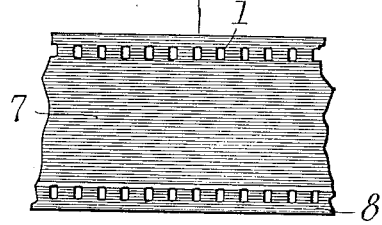

In Fig. 2 the number of perforations is increased, there being four for each intended picture area, this being the standard film for commercial uses.

Figure 3:
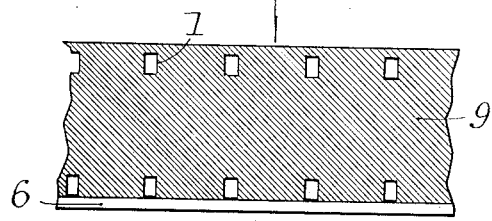
Figure 4:
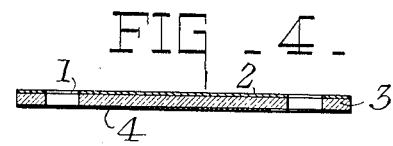
Fig. 4 is a section of Fig. 1 showing a preferred form.

In Fig. 3 the uncolored strip 6 is left at the extreme margin of the film outside of the perforations, thus leaving the entire area between the perforations for the motion picture exposure fields. In this form there is a single broad colored band 9.

It is obvious that numerous other embodiments of my invention are possible, and I contemplate as included in the scope thereto, all such modifications and equivalents as fall within the appended claims.

Having thus described my invention, what I claim as new and desire to secure by Letters Patent is:

1. A film strip for the simultaneous reproduction of motion pictures in a single color and of sound and comprising a transparent flexible support having upon one surface a photographically sensitive emulsion, a longitudinally extending area of said film strip constituting the greater part of the width thereof being uniformly colored with a material that is unaffected by photographic processes and constituting a series of motion picture exposure fields, and a second, uncolored, narrow, longitudinally extending area constituting a sound record area.

2. A film strip for the simultaneous reproduction of motion pictures in a single color and of sound and comprising a light transmitting flexible support having upon one surface a photographically sensitive layer, an area of uniform width extending longitudinally of the strip and uniformly colored with a material that is unaffected by photographic baths and constituting a series of motion picture exposure fields, and a second, uncolored, area of uniform width extending longitudinally of the strip parallel to the first area and constituting a sound record area.

3. A film for the simultaneous reproduction of motion pictures in a single color with audible accompaniment, the film being in the form of a long continuous band comprising a support of a transparent plastic cellulosic compound having upon one surface a uniform photographically sensitive emulsion and having the greater part of the other surface colored uniformly with a dye that penetrates into the support to a greater extent than ordinary photographic baths, and which is unaffected by photographic processes, the colored area being of uniform width, and a narrow uncolored area of uniform width extending longitudinally of the band parallel to the first area, the colored area of the film constituting a series of photographic picture exposure fields, and the uncolored area constituting a sound record area.

Signed at Rochester, New York this 18th day of June 1927.

ALBERT F. SULZER.